(12) United States Patent
Xu et al.

(10) Patent No.: US 12,430,182 B2
(45) Date of Patent: Sep. 30, 2025

(54) SERVICE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Shili Xu, Shenzhen (CN); Bingwu Zhong, Shenzhen (CN); Yabin Fu, Shenzhen (CN); Yanhui Lu, Shenzhen (CN); Kai Hong, Shenzhen (CN); Xiaohu Ma, Shenzhen (CN); Yulin Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 521 days.

(21) Appl. No.: 17/977,297

(22) Filed: Oct. 31, 2022

(65) Prior Publication Data

US 2023/0049501 A1    Feb. 16, 2023

Related U.S. Application Data

(63) Continuation of application No. PCT/CN2022/085444, filed on Apr. 7, 2022.

(30) Foreign Application Priority Data

Apr. 19, 2021   (CN) .......................... 202110421338.4

(51) Int. Cl.
  *G06F 9/50* (2006.01)
  *H04L 67/60* (2022.01)

(52) U.S. Cl.
  CPC .......... *G06F 9/5072* (2013.01); *G06F 9/5044* (2013.01); *G06F 9/505* (2013.01);
  (Continued)

(58) Field of Classification Search
  CPC ...... G06F 9/5072; G06F 9/5044; G06F 9/505; G06F 2209/501; G06F 2209/5015;
  (Continued)

(56) References Cited

U.S. PATENT DOCUMENTS 7,886,023 B1    2/2011  Johnson
2016/0308961 A1  10/2016  Rao
(Continued)

FOREIGN PATENT DOCUMENTS

CN    103916332 A    7/2014
CN    106302434 A    1/2017
(Continued)

OTHER PUBLICATIONS

The European Patent Office (EPO) The Extended European Search Report for 22790864.7, Apr. 9, 2024 30 Pages.
(Continued)

*Primary Examiner* — Thomas H Henry
(74) *Attorney, Agent, or Firm* — ANOVALAW GROUP PLLC

(57) ABSTRACT

A service processing method, performed by a cloud application management server, includes: upon receiving an allocation request from a target terminal, acquiring N pieces of selection reference information corresponding to a pending edge server and related to the target terminal and running reference information, the pending edge server being one of P edge servers connected to the cloud application management server; upon determining that the pending edge server meets a requirement of providing a running service of a target cloud application for the target terminal, determining a connection reference score corresponding to the pending edge server; storing the connection reference score and
(Continued)

identification information about the pending edge server into a candidate set; and transmitting the candidate set to the target terminal.

20 Claims, 6 Drawing Sheets

(52) U.S. Cl.
CPC .............. *G06F 2209/501* (2013.01); *G06F 2209/5015* (2013.01); *G06F 2209/5016* (2013.01); *G06F 2209/502* (2013.01); *G06F 2209/503* (2013.01); *H04L 67/60* (2022.05)

(58) Field of Classification Search
CPC ....... G06F 2209/5016; G06F 2209/502; G06F 2209/503
See application file for complete search history.

(56) References Cited

U.S. PATENT DOCUMENTS

2020/0314175 A1    10/2020  Dailianas et al.
2023/0010046 A1*    1/2023  Yan .................... H04L 67/1008

FOREIGN PATENT DOCUMENTS

| CN | 107920122 A | 4/2018 |
|---|---|---|
| CN | 108810170 A | 11/2018 |
| CN | 109768879 A | 5/2019 |
| CN | 110769038 A | 2/2020 |
| CN | 111371605 A | 7/2020 |
| CN | 111506414 A | 8/2020 |
| CN | 111611072 A | 9/2020 |
| CN | 111787069 A | 10/2020 |
| CN | 112073542 A | 12/2020 |
| CN | 113018871 A | 6/2021 |

OTHER PUBLICATIONS

China National Intellectual Property Administration (CNIPA) Office Action 1 for Application No. 202110421338.4 Mar. 31, 2025 15 Pages (including translation).
The World Intellectual Property Organization (WIPO) International Search Report for PCT/CN2022/085444 Jul. 5, 2022 7 Pages (including translation).

\* cited by examiner

SERVICE PROCESSING METHOD AND APPARATUS, AND STORAGE MEDIUM

CROSS-REFERENCES TO RELATED APPLICATIONS

This application is a continuation application of PCT Patent Application No. PCT/CN2022/085444, filed on Apr. 7, 2022, which claims priority to Chinese Patent Application No. 202110421338.4, entitled "SERVICE PROCESSING METHOD AND APPARATUS, AND STORAGE MEDIUM" filed with National Intellectual Property Administration on Apr. 19, 2021, the entire contents of both of which are incorporated herein by reference.

FIELD OF THE TECHNOLOGY

The present disclosure relates to the technical field of computers, in particular, to an information processing technology.

BACKGROUND OF THE DISCLOSURE

A cloud application refers to a novel application that changes a using mode of local installation and local operation of traditional software into a ready-to-use service, connects and controls a remote server cluster through the Internet or Local Area Network to complete a logical or operation task. Briefly, the cloud application refers to that the running and computing of a certain application are executed depending on a cloud server, and a terminal is responsible for picture display. For example, as a typical cloud application, a cloud game is an online game technology based on a cloud computing technology, and the cloud game technology enables a light-end device with relatively limited graphic processing and data computing capabilities to run a high-quality game. In a cloud game scene, a game runs in a cloud server rather than a player game terminal, and a game scene is rendered into a video-audio stream by the cloud server and is transmitted to the game player terminal through a network. The game player does not need to have powerful graphic computing and data processing capabilities, but only needs to have a basic streaming media playing capability and the capability of acquiring an instruction input by a player and transmitting the same to the cloud server.

The running of the cloud application requires very low network delay and very high network stability, and a network environment in a related art obviously cannot meet the network requirements of the cloud application, so the cloud application generally provides stable network quality for users by deploying edge servers. For example, the edge servers are deployed in cities close to the users or in more finely divided areas such as districts. These edge servers can provide a running service of the cloud application, and an each edge server is physically closer to the user, so the network delay can also be lower and more stable. In order to make as many users to access nearby edge server as possible, many edge servers may be deployed. Then, in practical applications, how to allocate appropriate edge servers for the users to access becomes a hot research issue.

SUMMARY

The embodiments of the present disclosure provide a service processing method and apparatus, and a storage medium, so as to balance the allocation of a connectable edge server to a terminal.

In one aspect, the embodiments of the present disclosure provide a service processing method. The service processing method is performed by a cloud application management server. The method includes: in response to receiving an allocation request transmitted by a target terminal, acquiring N pieces of selection reference information corresponding to a pending edge server and related to the target terminal and running reference information required for running the target cloud application, the pending edge server being one of P edge servers connected to the cloud application management server and configured to provide a running service of a target cloud application, N being an integer greater than or equal to 1, and the allocation request being transmitted when the target cloud application in the target terminal starts running; determining a connection reference score corresponding to the pending edge server according to the N pieces of selection reference information and a connection reference score determination rule in response to determining, according to the N pieces of selection reference information and the running reference information, that the pending edge server meets a requirement of providing the running service of the target cloud application for the target terminal; storing the connection reference score corresponding to the pending edge server and identification information about the pending edge server into a candidate set, the candidate set comprising identification information about M edge servers and connection reference scores corresponding to the M edge servers, and M being an integer greater than 1 and less than or equal to P; and transmitting the candidate set to the target terminal.

In one aspect, the embodiments of the present disclosure provide another service processing method, including: when a target cloud application in a target terminal starts running, transmitting, by the target terminal, an allocation request to a cloud application management server, the cloud application management server being connected to P edge servers, and the P edge servers being all configured to provide a running service of the target cloud application; the allocation request being used for instructing the cloud application management server to return a candidate set, the candidate set including connection reference scores of M edge servers and identification information about the M edge servers, and in response to determining, according to N pieces of selection reference information corresponding to the pending edge server and related to the target terminal and the running reference information required for running the target cloud application, that the pending edge server meets the requirement of providing a running service of the target cloud application for the target terminal, a method of determining the connection reference score of any of the M edge servers being to take each of the P edge servers as a pending edge server, and to determine according to the N pieces of selection reference information and the connection reference score; N being an integer greater than or equal to 1, and M being an integer greater than or equal to 1 and less than or equal to P; receiving, by the target terminal, the candidate set transmitted by the cloud application management server, and selecting a target edge server from the M edge servers according to the connection reference scores respectively corresponding to the M edge servers in the candidate set; and establishing, by the target terminal, a connection with the target edge server according to the identification information about the target edge server, so that the target edge server provides the running service of the target cloud application for the target terminal.

In one aspect, the embodiments of the present disclosure provide a service processing apparatus, including: a processor, adapted to execute a computer program; and a computer storage medium, storing a computer program, the computer program, when executed by the processor, implementing the service processing method according to any one of the foregoing embodiments.

In one aspect, the embodiments of the present disclosure provide a non-transitory computer storage medium, storing a computer program, the computer program, when executed by a processor, implementing the service processing method according to any one of the foregoing embodiments.

In the embodiments of the present disclosure, when a target cloud application in a target terminal starts running, the target terminal may transmit an allocation request to a cloud application management server. After receiving the allocation request, the cloud application management server takes each edge server as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when an edge server serving as a pending edge server satisfies a candidate condition for providing a running service of a target cloud application for a target terminal, the edge server can be stored in a candidate set. That is to say, M edge servers in the candidate set all meet a requirement of providing the running service of the target cloud application for the target terminal. Any edge server meeting the requirement of providing the running service of the target cloud application for the target terminal may be understood that a user has a better application experience when the any edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1:
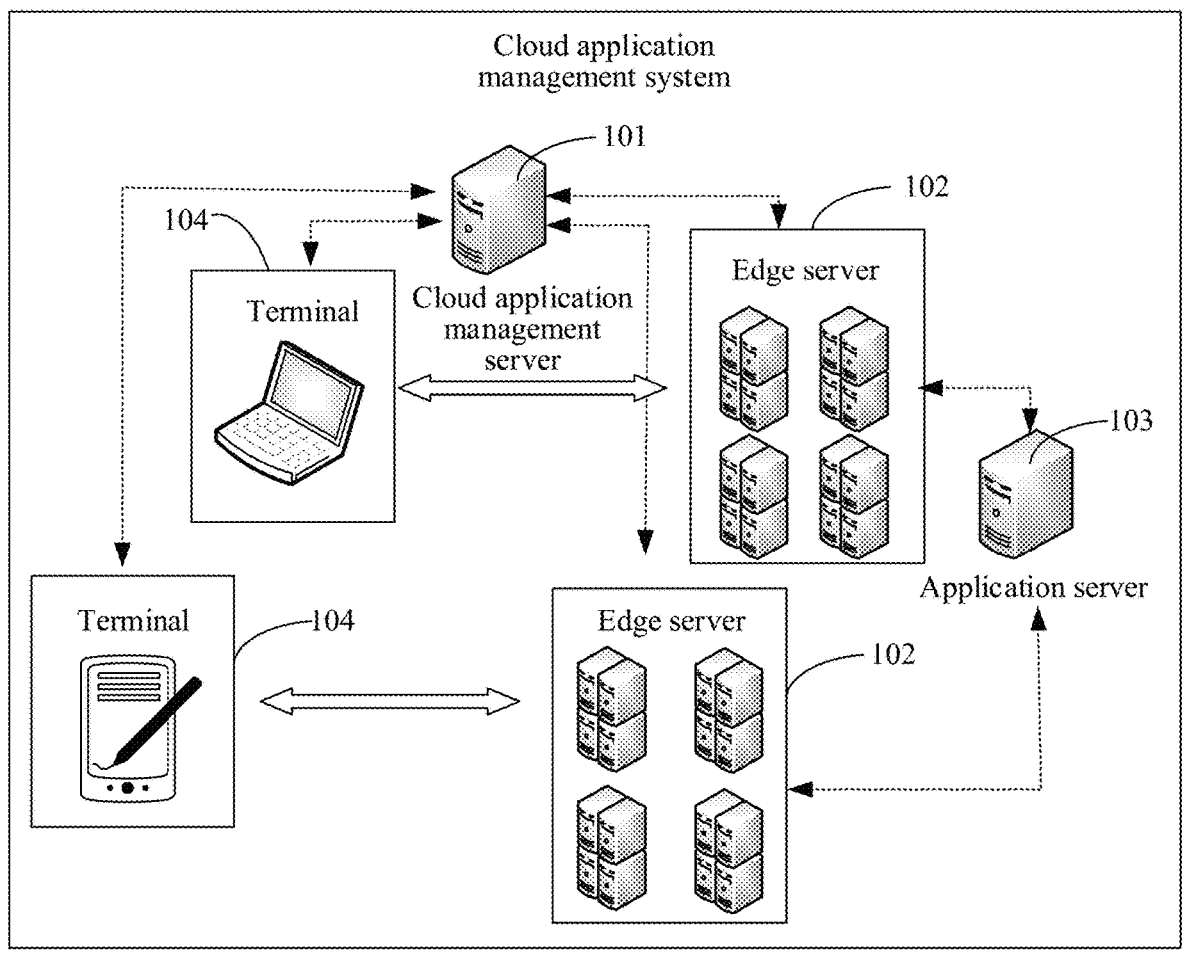
FIG. 1 is a schematic structural diagram of a cloud application management system provided by the embodiments of the present disclosure.

The following clearly and completely describes technical solutions in embodiments of the present disclosure with reference to the accompanying drawings in the embodiments of the present disclosure.

In the study of cloud applications, especially the most common cloud games, it has been found that it has become a hot trend to deploy edge servers deployed in a city close to a user or at an even more sinking place, and to provide running services of cloud applications for various user terminals through the edge servers. However, when a plurality of edge servers are deployed around a certain user, which edge server is selected to provide a running service of a cloud application for a terminal of the user becomes a new challenge. In the present disclosure, several solutions for allocating an edge server for a terminal are studied. Assuming that a target cloud application runs in a target terminal, the target terminal is any terminal, and the target cloud application is any cloud application, several allocation solutions studied in the embodiments of the present disclosure are introduced below by taking the allocation of the edge server to the target terminal as an example.

First: A physically closest edge server is selected. In one embodiment, distances between a plurality of edge servers and a target terminal are acquired. An edge server at the minimum distance from a target terminal is allocated to the target terminal, and the target terminal is connected with the edge server, so that the edge server provides a running service of a target cloud application for the target terminal.

Second: An edge server with the best network quality is selected. It can be known from the foregoing that the scenario rendering of a cloud application by a cloud server is mainly transmitted to a terminal of a cloud application user through a network. Therefore, the edge server with the best network quality can be allocated to a target terminal for connection. In one embodiment, the network quality of the communication between each edge server and the target terminal at the current time is acquired. The edge server with the best network quality is selected and allocated to the target terminal.

Third: Firstly, a part of edge servers are screened out from a plurality of edge servers. The network quality between the part of edge servers and a target terminal meets a requirement of running a target cloud application in the target terminal, such as meeting the reference network quality for running a target cloud application, or meeting the reference resource quantity required for running the target cloud application, etc. Then, a connection reference score is determined for each edge server according to a plurality of pieces of dimension information (such as network quality, available resource quantity, operation cost, etc.) related to the target terminal of each screened edge server. Finally, the target terminal selects a target edge server from the plurality of edge services to connect according to the connection reference score of each edge server.

In comparison with the above-mentioned several allocation solutions proposed in the present disclosure, the first allocation solution and the second allocation solution both start from a single dimension, which may give a user a better cloud application use experience, but it is very likely to lead to a situation that some edge servers are full and some edge servers are idle in a peak period of users.

In addition, when the edge server is allocated to the target terminal by the first solution, the reference network quality when the target terminal runs the target cloud application is not considered, and it is possible that the network quality of the edge server is lower than the reference network quality although the distance between a certain edge server and the target terminal is closest, which will reduce the user experience when the edge server is configured to provide the running service of the target cloud application for the target terminal. When the second allocation solution is used, only the edge server with the best network quality is considered to be allocated to the user, but the available resource quantity and other information such as the operation cost of the edge server are not considered, so that the edge server may be full. Thus, part users may need to queue up. But in fact, it is possible that other edge servers can also provide the running service of the target cloud application for these queued users.

However, in the third allocation solution, the problems in the above-mentioned two allocation solutions are solved. In the third allocation solution, according to a plurality of pieces of dimension information about each edge server, a connection reference scores of a plurality of edge servers meeting a requirement of providing the running service of the target cloud application for the target terminal are calculated. The target terminal selects any edge server for connection according to the connection reference score of each edge server, and any edge server can provide a better cloud application experience for a user, so that a more appropriate edge server meeting the requirement can be provided for the target terminal. The rationality and balance of the allocation of the edge servers are realized.

Based on the third allocation solution, the embodiments of the present disclosure provide a cloud application management system, with reference to FIG. 1, which is a schematic structural diagram of the cloud application management system provided by the embodiments of the present disclosure. The cloud application management system shown in FIG. 1 may include a cloud application management server 101, a plurality of edge servers 102, an application server 103, and at least one terminal 104. The edge server 102 may be connected with the application server 103 and the terminal 104 respectively. The application server 103 may provide running data of a cloud application for the edge server 102. The edge server 102 performs picture rendering and other operations according to the running data provided by the application server 103, so as to transmit a rendered picture to the terminal 104 for display, thereby providing the running service of the cloud application for the terminal 104.

The cloud application management server 101 can be connected with each of the terminal 104 and the edge server 102. The cloud application management server 101 is mainly used for the scheduling the plurality of edge servers 102 to allocate an appropriate edge server to the terminal 104. In one embodiment, a cloud application client runs in the terminal 104. When a target cloud application in the cloud application client of the terminal 104 starts running, the terminal 104 transmits an allocation request to the cloud application management server 101. After receiving the allocation request, the cloud application management server 101 takes each edge server 102 as a pending edge server to acquire N pieces of selection reference information corresponding to the pending edge server and related to the terminal 104, such as the network quality (including instant network quality and historical network quality) of the communication between the pending edge server and the terminal 104, the available resource quantity of each edge server, and the operation cost of each edge server. Further, the cloud application management server 101 determines that the pending edge server meets the requirement of providing the running service of the target cloud application for the target terminal according to N pieces of selection reference information about any edge server 102 and running reference information required for running the target cloud application in the terminal 104, calculates a connection reference score of the pending edge server 102 according to the N pieces of reference selection information corresponding to the pending edge server, and stores the connection reference score and identification information about the edge server 102 as the pending edge server into a candidate set.

The above-mentioned only lists a processing procedure of the cloud application management server 101 on an edge server. In practical applications, the cloud application management server 101 performs the same processing procedure mentioned above on each edge server in FIG. 1, and finally obtains a candidate set. The candidate set may store connection reference scores of M edge servers 102 and identification information about each edge server 102. The cloud application management server 101 transmits the candidate set to the terminal 104. The terminal 104 selects any one edge server from the M edge servers to establish connection, so that the edge server establishing a connection with the terminal 104 provides the running service of the cloud application for the terminal 104.

Figure 2:
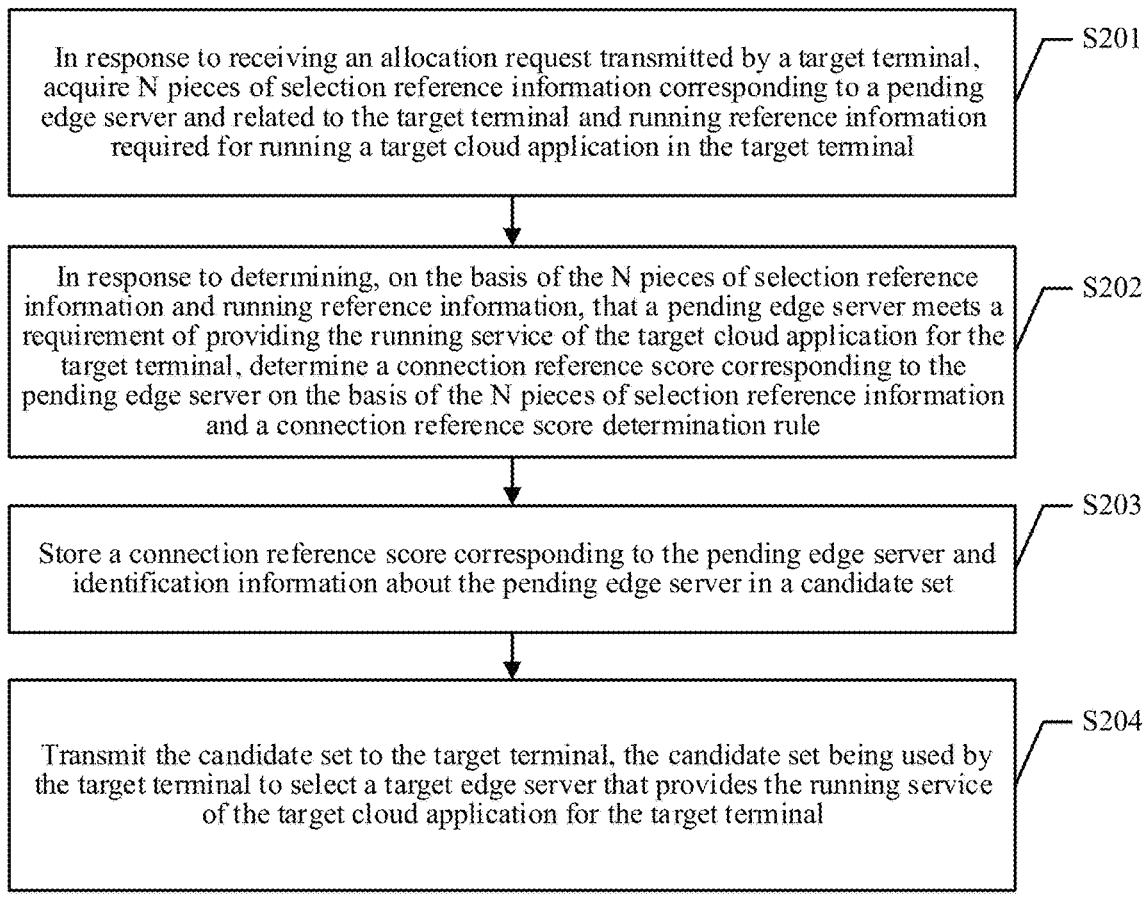
FIG. 2 is a schematic flowchart of a service processing method provided by the embodiments of the present disclosure.

Based on the above-mentioned cloud application management system, the embodiments of the present disclosure provide a service processing method, with reference to FIG. 2, which is a schematic flowchart of a service processing method provided by the embodiments of the present disclosure. The service processing method shown in FIG. 2 may be performed by a cloud application management server, and specifically, may be performed by a processor of the cloud application management server. The service processing method shown in FIG. 2 may include the following steps:

S201. In response to receiving an allocation request transmitted by a target terminal, acquire N pieces of selection reference information corresponding to a pending edge server and related to the target terminal and running reference information required for running a target cloud application in the target terminal, the pending edge server being one of the P edge servers. In some embodiments, each of the P edge servers can be considered by the cloud application management server as a pending edge server to respectively acquire corresponding N pieces of selection reference information.

In one embodiment, the target terminal may refer to any terminal device having a picture display function, such as a smartphone, a tablet computer, a notebook computer, a desktop computer, a smart speaker, a smart watch, and a smart car.

In one embodiment, the cloud application client may run on the target terminal. The allocation request may be transmitted by the target terminal when a target cloud application starts running in the cloud application client. The target cloud application may refer to any of a plurality of cloud applications supported in the cloud application clients. For example, if the cloud application client is a cloud game client, then the target cloud application refers to any including a cloud game in the cloud game client. For another example, if the cloud application client is a cloud education client, then the target cloud application refers to any one of a plurality of education contents in the cloud education client. The allocation request may carry a terminal identifier of the target terminal. After receiving the allocation request, the target cloud application management server may acquire N pieces of selection reference information corresponding to the pending edge server and related to the target terminal according to the terminal identifier.

In one embodiment, the operation that a cloud application management server acquires N pieces of selection reference information corresponding to the pending edge server and related to the target terminal according to the terminal identifier may include the following steps: A selection reference information acquisition request carrying a terminal identifier of the target terminal is transmitted to a pending edge server. After receiving the selection reference information acquisition request, the pending edge server acquires N pieces of selection reference information corresponding to the pending edge server and related to the target terminal, and returns the N pieces of selection reference information to the cloud application management server. The N pieces of selection reference information may include a combination of one or more of the following: instant network quality, historical network quality, available resource quantity, and operation cost for providing a running service of a target cloud application. How these types of information are determined is separately described below.

(1) The operation cost is obtained by performing an operation according to various resources required when providing the running service of the target cloud application and unit resource cost corresponding to the various resources. In one embodiment, the bandwidth cost and the resource cost required when a pending edge server provides the running service of the target cloud application are acquired. The server room rental cost of the pending edge server is acquired. An addition operation is performed on the bandwidth cost, the resource cost, and the server room rental cost to obtain the operation cost for the pending edge server to provide the running service of the target cloud application.

The bandwidth cost is obtained by performing a multiplication operation on the unit bandwidth cost of the pending edge server and the bandwidth required when providing the running service of the target cloud application. For example, the unit bandwidth cost of the pending edge server is represented as W, and the bandwidth required when providing the running service of the target cloud application is represented as G, then the bandwidth cost when the pending edge server provides the running service of the target cloud application is G*W. The resource cost is obtained by performing a multiplication operation on the resource required for providing the running service of the target cloud application and the unit resource cost. The resource may include a central processing unit (CPU) resource and a graphics processing unit (GPU) resource, the unit resource cost includes unit CPU resource cost and unit GPU resource cost, the resource required for providing the running service of the target cloud application includes a CPU resource and a GPU resource, and then the resource cost can be represented as: Unit CPU resource cost*Required CPU resource+Unit GPU resource*Required GPU resource.

The server room rental cost is obtained by dividing the total rental cost for renting a server room for the pending edge server to be deployed by the maximum number of users that the pending edge server can carry. It is assumed that the resource cost is represented as F, and the server room rental cost is represented as Z. The operation cost for the pending edge server to provide the running service of the target cloud application may be represented as C, and then C=G*W+Z+F.

(2) The available resource quantity is determined according to the total resource quantity and the used resource quantity of the pending edge server. In one embodiment, the available resource quantity of the pending edge server is obtained by subtracting the used resource quantity from the total resource quantity. In one embodiment, one cloud application client may include a plurality of different cloud applications. For example, a plurality of different cloud games run on the cloud application client, the resource quantity required for running each cloud application is known, and the cloud application management server may determine the used resource quantity according to the number of cloud applications carried currently. For example, the cloud application client is a cloud game client. The cloud game client may include cloud games A and cloud games B. The resource quantity required for running one cloud game A is M, and the resource quantity required for running one game B is W. Assuming that the current pending edge server carries one cloud game A and one cloud game B, then the available resource quantity of the pending edge server is represented as: Total resource quantity-M-W.

The resources mentioned herein may include any one or more of a CPU resource, a GPU resource, and a memory resource. The available resource quantity of each resource is calculated by using the same method described above for each resource.

(3) The instant network quality may also be referred to as real-time network quality, and is used for reflecting the network quality of the communication between a pending edge server and a target terminal at the current time. The instant network quality may be calculated by the pending edge server according to the current communication data between the target terminal and the pending edge server. The current communication data may refer to the condition of transmitting a data packet within the current time, such as how the pending edge server transmits the data packet and when the target terminal receives the data packet. The current time period may refer to a period of time closest to the current time, such as the last few minutes and the last hour. The instant network quality may also be carried by the target terminal in an allocation request and transmitted to a cloud application management server.

The instant network quality may refer to any one or more of the indicators such as an average delay, a jitter rate, and a packet loss rate. The packet loss rate is obtained by dividing the number of lost data packets at the current time by the total number of transmitted data packets. In order to count the jitter rate of the current time, the current time is sampled, so as to divide the current time into a plurality of time intervals. The sampling rate may be 1 s, and then the length of one time interval is 1 s. A network delay of each time interval is calculated. An averaging operation is performed on the network delays in a plurality of time intervals to obtain an average delay. A variance operation is performed according to the average delay and each time interval, so as to obtain a variance as the jitter rate.

For example, H time intervals are obtained after sampling the current time, $X_i$ represents the network delay of the $i^{th}$ time interval, and the value of i is 1-H$^\mu$ represents the average network delay, $\sigma^2$ represents the jitter rate, and the jitter rate may be calculated by the following formula:

$$\sigma^2 = \frac{\sum_{k=1}^{H}(X_i - \mu)^2}{H}$$

The network delay of each time interval is calculated according to the time for transmitting one data packet and the time for receiving an acknowledgment receipt message of the data packet in the time interval. If one time interval includes a plurality of data packets, the network delay of the time interval is an average value of the network delays for transmitting each data packet.

The historical network quality is used for reflecting the network quality of the communication between the pending edge server and the target terminal at a historical time. The historical time may refer to the past month, the past year, or an even longer time.

In one embodiment, the historical network quality is calculated by a pending edge server according to historical communication data between a target terminal and the pending edge server. The historical network quality may include any one or more of the indicators such as an average delay, a jitter rate, and a packet loss rate. The calculation mode for each indicator included in a historical network is the same as the calculation mode for each indicator in the above-mentioned instant network, which will not be elaborated herein. In one embodiment, a cloud application management server may acquire all historical communication data of the communication between a pending edge server and a target terminal; and count the historical network quality between the pending edge server and the target terminal according to the historical communication data.

It is to be understood that, at the historical time, the target terminal may establish connection and communicate with the pending edge server according to different connection information. The connection information may include an access mode, an operator where the target terminal is located, and an area where the target terminal is located. The access mode may include data traffic access and wireless access. Different connection information may have different influences on the network quality of the communication. In the embodiments of the present disclosure, an appropriate edge server is selected for the target terminal when the target terminal communicates with the pending edge server by using current connection information, so the historical communication data that the target terminal communicates with the pending edge server by using the same connection information as the current connection information in the historical time is more meaningful for reference. For example, the current connection information refers to data traffic access, an XX operator, and the target terminal being located in area A, then in the historical communication data between the pending edge server and the target terminal, the historical communication data that the target terminal communicates with the pending edge server by using the data traffic access, the XX operator where the target terminal is located, and the target terminal being located in area A is more valuable for reference.

Based on this, in another embodiment, a cloud application management server can acquire all the historical communication data of the communication between the pending edge server and the target terminal; filter the historical communication data with the same connection information as the current connection information from all the historical communication data; and calculate historical network quality according to the filtered historical communication data.

In another embodiment, the historical network quality may be calculated by the pending edge server according to the historical communication data between other terminals and the pending edge server. The other terminals refer to at least one terminal that is located in the same area, establishes a connection with the pending edge server in the same access mode, and is serviced by a same operator as the target terminal. It is to be understood that, in practical applications, the target terminal may not communicate with the pending edge server during the historical time, and then there is no historical communication data between the target terminal and the pending edge server. At this time, in order to obtain the historical network quality, in the embodiments of the present disclosure, historical communication data of a specific set may be acquired to measure the historical network quality between the pending edge server and the target terminal. The historical communication data of the specific set includes historical communication data between other terminals and the pending edge server. The other terminals refer to at least one terminal having the same access mode, the same operator, and the same area as the target terminal.

In one embodiment, if there are a plurality of other terminals, then the historical network quality between each of the other terminals and the pending edge server can be calculated respectively when the historical network quality is calculated, finally an averaging operation is performed on all the calculated historical network quality, and an operation result is taken as the historical network quality between the target terminal and the pending edge server.

In specific use, even if there is historical communication data between the target terminal and the pending edge server, the historical network quality may also be calculated according to the historical communication data between the other terminals and the pending edge server. Alternatively, the historical network quality may be counted by using the historical communication data between the target terminal and the pending edge server, and the historical communication data between the other terminals and the pending edge server.

In one embodiment, an allocation request transmitted by a target terminal to a cloud application management server may further comprise an application identifier of a target cloud application. The cloud application management server may acquire, according to the application identifier, running reference information required for running a cloud application. The running reference information may include the reference network quality and the resource quantity required for running the target cloud application. The reference network quality is pre-set and stored in the cloud application management server, and there may be application identifiers of a plurality of cloud applications and the reference network quality corresponding to each cloud application in the cloud application management server. The reference network quality corresponding to the application identifier of the target cloud application is acquired from the storage of the cloud application management server. The required resource quantity may include the required CPU resource quantity, GPU resource quantity, and memory size, etc.

It is to be understood that the requirements of different cloud applications on the network quality are not completely consistent, but due to the particularity of the cloud applications, the rendering thereof is performed in an edge server. Therefore, most network communication occurs between the edge server and an application server, and a terminal of a user does not directly interact with the application server, but only performs video stream and operation data stream interaction with the edge server. A video stream is independent of the types of the cloud applications. That is to say, the requirements of the video stream on the network quality are the same regardless the types of the cloud applications. Therefore, for different cloud applications, only the requirements of operation data on the network quality need to be evaluated. Then, the reference network quality of the target cloud application may be obtained by testing the requirements of the operation data on the network quality. In one embodiment, the cloud application management server is required to identify an operation scenario which has the greatest influence on the target cloud application, and then tests are performed under different network quality conditions to ensure the lowest network quality required for the best application experience of a user. The lowest network quality is taken as the reference network quality.

The reference network quality may include the indicators such as a network delay, a jitter rate and a packet loss rate. These indicators included in the reference network quality are the lowest requirements required for ensuring the best application experience of the user. For example, the network delay included in the reference network quality is the highest network delay that can be tolerated to ensure the best application experience of the user, and the jitter rate included in the reference network quality is the highest jitter rate that can be tolerated to ensure the best application experience of the user.

S202. In response to determining, according to the N pieces of selection reference information and running reference information, that a pending edge server meets the requirement of providing the running service of the target cloud application for the target terminal, determine a connection reference score corresponding to the pending edge server according to the N pieces of selection reference information and a connection reference score determination rule.

Before calculating the connection reference score corresponding to the pending edge server, whether the pending edge server meets the requirement of providing the running service of the target cloud application for the target terminal may be determined according to the N pieces of selection reference information and the running reference information. If the pending edge server meets the requirement, then a step of determining the connection reference score corresponding to the pending edge server is performed. If the pending edge server does not meet the requirement, the connection reference score corresponding to the pending edge server may not be calculated.

In one embodiment, if the N pieces of selection reference information include instant network quality and historical network quality, and the running reference information includes reference network quality, the operation that whether the pending edge server meets the requirement of providing the running service of the target cloud application for the target terminal is determined according to the N pieces of selection reference information and the running reference information includes the following steps: A cloud application management server determines benchmark network quality for the communication between the pending edge server and the target terminal according to the instant network quality and the historical network quality. When the benchmark network quality is higher than or equal to the reference network quality, it is determined that the pending edge server meets the requirement of providing the running service of the target cloud application for the target terminal. On the contrary, when the benchmark network quality is lower than the reference network quality, it is confirmed that the pending edge server does not meet a requirement of providing the running service of the target cloud application for the target terminal.

In one embodiment, the operation that benchmark network quality for the communication between the pending edge server and the target terminal is determined according to the instant network quality and the historical network quality may include the following step: The poorer of the instant network quality and the historical network quality is taken as the reference network quality. In order to ensure that the user has the best experience in the case that the pending edge server provides the running service of the target cloud application for the target terminal, it needs to ensure that the instant network quality and the historical network quality of the pending edge server can both be higher than the reference network quality, so the poorer of the instant network quality and the historical network quality needs to be taken as the benchmark network quality during calculating.

In another embodiment, if the N pieces of selection reference information include available resource quantity of the pending edge server, and the running reference information includes the resource quantity required for running the target cloud application, whether the pending edge server meets the requirement of providing the running service of the target cloud application for the target terminal is determined according to the N pieces of selection reference information and the running reference information includes the following step: If the available resource quantity is greater than the required resource quantity, it is determined that the pending edge server meets the requirement of providing the running service of the target cloud application for the target terminal.

In yet another embodiment, if the N pieces of selection reference information include available resource quantity, instant network quality, and historical network quality, and the running reference information includes reference network quality and resource quantity required for operating the target cloud application, then the operation that whether the pending edge server meets the requirement of providing the running service of the target cloud application for the target terminal is determined may include the following steps: When the benchmark network quality is higher than or equal to the reference network quality, and the available resource quantity is greater than or equal to the required resource quantity, then it is determined that the pending edge server meets the requirement of providing the running service of the target cloud application for the target terminal.

Since there are a plurality of edge servers, there may be more than one edge server meets the requirement of providing the running service of the target cloud application for the target terminal, then in order to facilitate selecting, by the target terminal, an appropriate edge server from the plurality of edge servers meeting the requirement of providing the running service of the target cloud application for the target terminal for connection, a selection basis needs to be provided for the target terminal. In the embodiments of the present disclosure, a connection reference score may be calculated for each edge server meeting the requirement of providing the running service of the target cloud application for the target terminal, so that the target terminal performs selection according to the connection reference score.

Based on this, after it is determined that the pending edge server meets the requirement of providing the running service of the target cloud application for the target terminal, the connection reference score of the pending edge server may further be calculated according to N pieces of selection reference information and a connection reference score determination rule. In one embodiment, a first weight value corresponding to reference network quality, a second weight value corresponding to operation cost, and a third weight value corresponding to available resource quantity are acquired. The benchmark network quality, the first weight value, the operation cost, the second weight value, the available resource quantity, and the third weight value are input into an operation formula corresponding to the connection reference score determination rule for calculation, so as to obtain a connection reference score corresponding to the pending edge server. For example, assuming that the benchmark network quality is represented as w, the operation cost is represented as c, the available resource quantity is represented as m, the first weight value is represented as k1, the second weight value is represented as k2, and the third weight value is represented as k3, the operation formula corresponding to the connection reference score determination rule can be represented as the following formula:

$$f = \text{Normalization}(c) * k1 + \text{Normalization}(w) * k2 + \text{Normalization}(m) * k3$$

where, f represents a joint reference score, Normalization represents a normalization operation, and the parameters after the normalization operation all become comparable values. The connection reference score corresponding to the pending edge server can be obtained by substituting N pieces of selection reference information corresponding to the pending edge server and weight values corresponding to each piece of selection reference information into the above-mentioned operation formula. In practical applications, a weight value corresponding to a more concerned selection reference information may be selected and set as a greater value when an edge server is selected. For example, if the operation cost is more concerned, then the second weight value corresponding to the operation cost is set as a greater value. If the network quality is more concerned, then the first weight value corresponding to the benchmark network quality is set as a greater value.

S203. Store a connection reference score corresponding to the pending edge server and identification information about the pending edge server in a candidate set.

After the connection reference score corresponding to the pending edge server is calculated, the connection reference score corresponding to the pending edge server and the identification information about the pending edge server may be stored in a candidate set. The candidate set includes connection reference scores of M edge servers and identification information about the M edge servers. The M edge servers include the above-mentioned edge server as the pending edge server. The connection reference score of each edge server in the candidate set may be obtained through above-mentioned S202 and S203, which will not be elaborated herein. That is to say, the network quality of the communication between each edge server in the candidate set and the target terminal meets the reference network quality. These edge servers all may provide the running service of the target cloud application for the target terminal, and all may enable a user to have the best application experience during using a cloud application.

The identification information of the pending edge server may be any information capable of uniquely identifying a pending edge server, such as name information, connection address information, etc. The target terminal may establish a connection with the pending edge server according to the identification information of the pending edge server.

S204. Transmit the candidate set to the target terminal, the candidate set being used by the target terminal to select a target edge server that provides the running service of the target cloud application for the target terminal. For example, the target terminal selects a target edge server according to the connection reference scores corresponding to the M edge servers; and establish a connection with the target edge server according to the identification information corresponding to the target edge server, so that the target edge server provides the running service of the target cloud application for the target terminal.

In one embodiment, after S201-S203 are performed on all of the plurality of edge servers, a candidate set capable of providing a running service of a target cloud application for a target terminal may be obtained. A cloud application management server transmits the candidate set to the target terminal. The target terminal can select a target edge server from M edge servers according to connection reference scores of the M edge servers, and establish a connection with the target edge server, so that the target edge server provides the running service of the target cloud application for the target terminal.

In one embodiment, the operation that the target terminal selects a target edge server from the M edge servers according to the connection reference scores of the M edge servers includes the following step: Take the edge server with the highest connection reference score as the target edge server.

In the embodiments of the present disclosure, when a target cloud application in a target terminal starts running, the target terminal may transmit an allocation request to a cloud application management server. After receiving the allocation request, the cloud application management server takes each edge server as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server meets a requirement of providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

Figure 3:
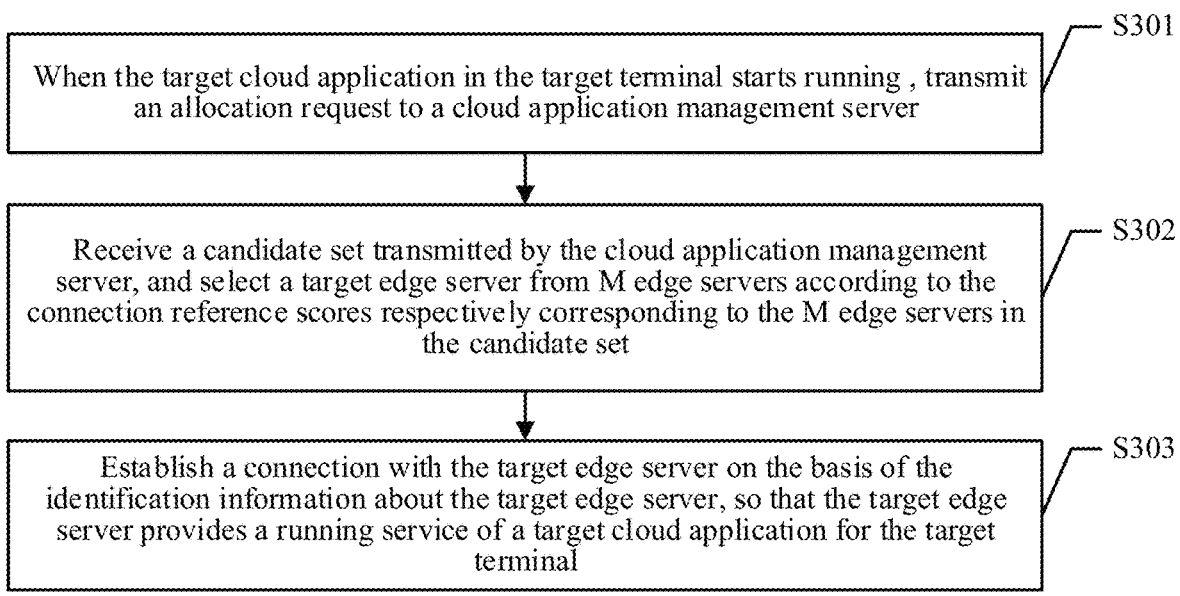
FIG. 3 is a schematic flowchart of another service processing method provided by the embodiments of the present disclosure.

Based on the above-mentioned cloud application management system and service processing method, the embodiments of the present disclosure also provide another service processing method. With reference to FIG. 3, which is a schematic flowchart of another service processing method provided by the embodiments of the present disclosure, the service processing method shown in FIG. 3 is performed by a target terminal, and specifically, may be performed by a processor of the target terminal. The service processing method shown in FIG. 3 may include the following steps:

S301. When the target cloud application in the target terminal starts running, transmit an allocation request to a cloud application management server.

It can be known from the foregoing that the cloud application management server is connected to P edge servers. The P edge servers all can provide a running service of the target cloud application for a target. The allocation request is used for instructing the cloud application management server to return a candidate set. The candidate set may be determined by the cloud application management server through S201-S203. A specific determination mode may refer to the description of S201-S203 in the embodiment of FIG. 2, which will not be elaborated herein.

S302. Receive a candidate set transmitted by the cloud application management server, and select a target edge server from M edge servers according to the connection reference scores respectively corresponding to the M edge servers in the candidate set.

In one embodiment, the operation that the target terminal selects a target edge server from the M edge servers according to the connection reference scores corresponding to the M edge servers may include the following step: Take any one of the M edge servers as the target edge server. It can be known from the foregoing that the M edge servers are all edge servers that meet a requirement of providing the running service of the target cloud application for the target terminal and can provide the running service of the target cloud application for the target terminal. When the edge server that meets the requirement of providing the running service of the cloud application for the target terminal provides the running service of a cloud application for the target terminal, it can ensure that a user has an optimal experience of the target cloud application. That is to say, no matter which of the M edge servers provides the running service of the target cloud application for the target terminal, it can ensure that the user has the optimal application experience. Therefore, the target terminal randomly selects any edge server as the target edge server.

In another embodiment, the operation that a target edge server is selected from M edge servers according to connection reference scores corresponding to the M edge servers includes the following steps: Traverse M edge servers to determine edge servers in a connectable state. Select the edge server with the highest connection reference score or the lowest operation cost from the edge servers in the connectable state as the target edge server. An edge server in a connectable state refers to that the edge server is not in a full state. That is to say, the edge server can also carry a target cloud application. Then, the edge server in a connectable state with the highest connection score is taken as the target edge server. When one edge server is in a full state, if a target terminal is expected to connect with the same, it needs to queue up, which will make a user wait for a long time to enter a target cloud game. According to the embodiments of the present disclosure, the edge servers in a full state are filtered away, which can shorten the time for the target terminal to obtain a running service of a target cloud application, thereby shortening the waiting time for the user to enter the target cloud application, and improving the user experience.

In yet another embodiment, the operation that a target edge server is selected from M edge servers according to connection reference scores corresponding to the M edge servers includes the following steps: Acquire, from the M edge servers, a plurality of candidate edge servers at the distance from a target terminal less than a distance threshold. Take the edge server with the highest connection reference score of the plurality of candidate edge servers as the target edge server. The connection between the edge server at the distance from the target terminal less than the distance threshold and the target terminal is more stable, which will not cause a problem of connection interruption due to too long distance. Therefore, the stability of running of the target cloud application can be ensured by taking the edge server with the highest connection reference score of the plurality of candidate edge servers as the target edge server.

S303. Establish a connection with the target edge server according to the identification information about the target edge server, so that the target edge server provides the running service of the target cloud application for the target terminal.

After determining the target edge server from the M candidate edge servers, the target terminal can transmit a connection request to the target edge server through the identification information about the target edge server. After receiving the connection request, the target edge server establishes a connection with the target terminal, and provides the running service of the target cloud application for the target terminal.

In the embodiments of the present disclosure, when a target cloud application in a target terminal starts running, the target terminal may transmit an allocation request to a cloud application management server. After receiving the allocation request, the cloud application management server takes each edge server as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server meets a requirement of providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

Figure 4:
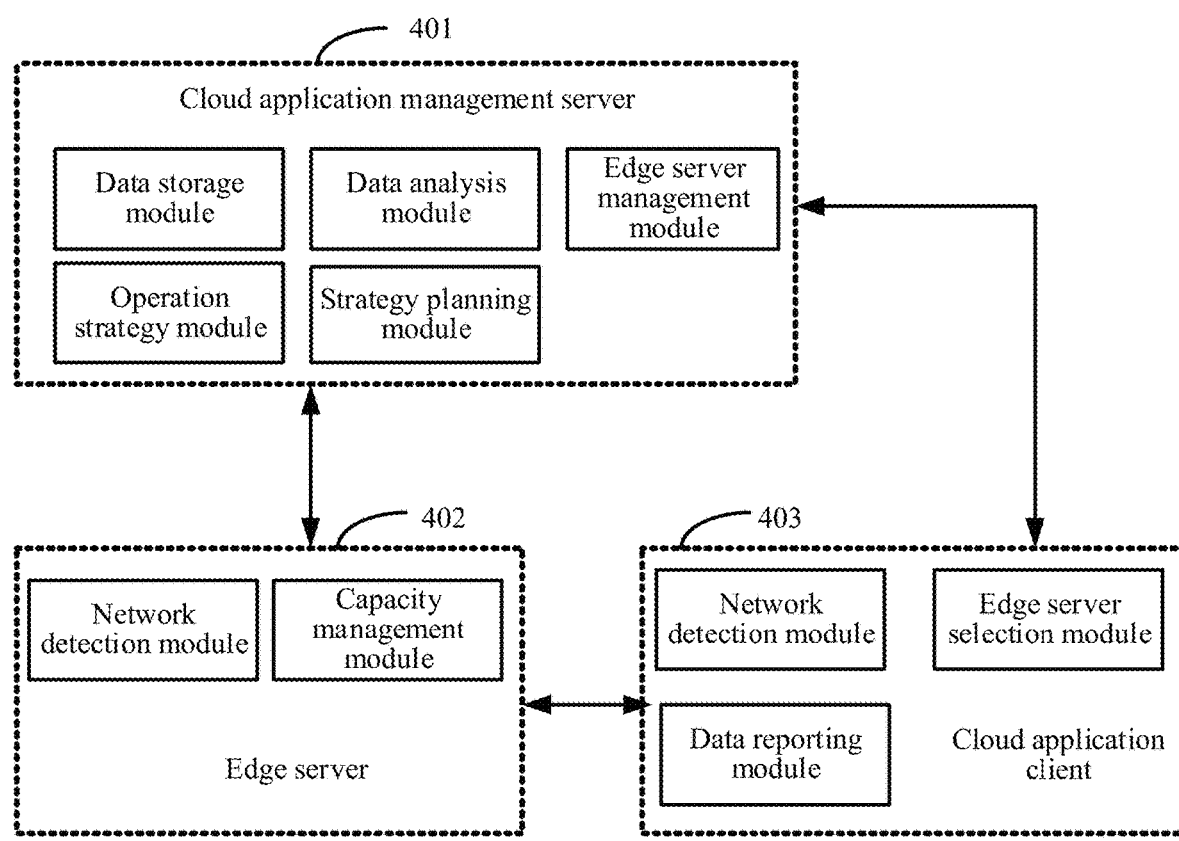
FIG. 4 is a service processing architecture diagram provided by the embodiments of the present disclosure.

Based on the above-mentioned service processing method embodiments, the embodiments of the present disclosure provide an architecture diagram of a service processing system, with reference to FIG. 4, which is an architecture diagram of the service processing system provided for the embodiments of the present disclosure. The service processing architecture shown in FIG. 4 includes a cloud application management server 401, an application server 402, and a cloud application client 403. The cloud application management server 401, the edge server 402, and the cloud application client 403 are interconnected, and the cloud application client 403 may run on a target terminal.

In one embodiment, the cloud application client 403 may include a selection module, a network detection module, and a data reporting module. A selection module is configured to pull an available edge server from an edge server management module of a cloud application management server, issue a network detection instruction to the network detection module, receive a candidate set issued by the cloud application management server 401, and select a target edge server from the candidate set to establish a connection. The network detection module is configured to detect instant network quality and historical network quality of each edge server according to the network detection instruction issued by the edge server selection module, and return network quality (including the instant network quality, or the instant network quality and the historical network quality) of each edge server to the data reporting module. The data reporting module reports the network quality of each edge server acquired by the network detection module to the cloud application management server 401.

In one embodiment, the edge server 402 may include a network detection module and a capacity management module. The network detection module is configured to receive a network detection request of the cloud application client, and acquire communication data at the current time in real time, so that the target terminal where the cloud application client is located can detect the instant network quality of the edge server in real time. The capacity management module is configured to calculate the total resource quantity of the edge server, or the total carrying capacity and the current used resource quantity, and calculate the available resource quantity. The available resource quantity here can be represented by the number of cloud applications that the edge server can carry. For example, cloud application A of two cloud application clients and cloud application B of one cloud application client may also run on the edge server. The capacity management module reports the result obtained by the above-mentioned calculation to the cloud application management server 401 in real time as a candidate allocation basis, or the capacity management module may also report in response to receiving an available resource quantity query request transmitted by the cloud application management server 401.

In one embodiment, the cloud application management server may include an edge server management module, a data storage module, a data analysis module, an operation strategy module, and a strategy planning module. The edge server management module is configured to receive the instant network quality and the historical network quality of each edge server reported by the data reporting module of a cloud application client, determine a candidate set according to the operation cost for providing a running service of a target cloud application by each edge server and the available resource quantity of each edge server calculated by the data analysis module (embodiments of this part may refer to the introductions of S202 and S203 in the embodiments of FIG. 2, which will not be elaborated herein), and provide the candidate set for the cloud application client 403. Alternatively, various edge servers in the candidate set may be ranked from high to low according to the connection reference score of each edge server. The data storage module is configured to receive the network quality of each edge server reported by the data reporting module in the cloud application client 403, and associate and store the network quality of each edge server, according to multi-dimensional information such as an access mode, an area where the cloud application client is located, and an operator to which the terminal where the cloud application client is located belongs, for the data analysis module to read and calculate. In addition, the data storage module may also obtain and store the available resource quantity of each edge server.

The data analysis module is configured to analyze the reference network quality of each edge server according to the instant network quality and the historical network quality of each edge server stored in the data storage module, and calculate the available resource quantity and the operation cost of each edge server. The operation strategy module is configured to provide a detailed strategy for each cloud application to allocate an edge server, which is mainly the configuration of the foregoing first weight value, second weight value, and third weight value. These three weight values may be different for different cloud applications in a cloud application client. The strategy planning module is configured to store the running reference information during the running of different cloud applications in the cloud application client, such as reference network quality and required resource quantity; meanwhile, detect the user experience according to the actual running condition of a target cloud application, and determine whether the weight allocation of the operation strategy module is reasonable, whether the candidate set allocated to the cloud application client is reasonable, etc. When the edge server connected with the cloud application client can meet the reference network quality required by the target cloud application, but the user experience is still impaired, the operation strategy may be adjusted in time.

Figure 5:
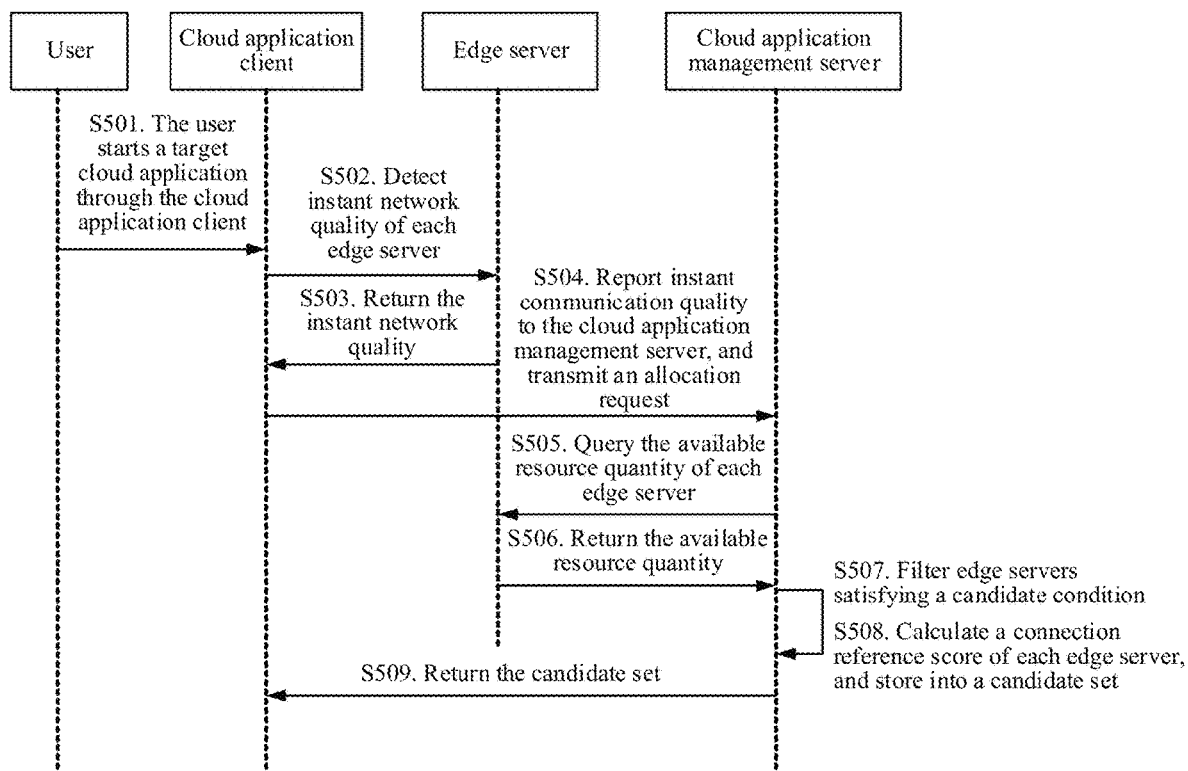
FIG. 5 is a schematic flowchart of yet another service processing method provided by the embodiments of the present disclosure.

Based on the service processing architecture shown in FIG. 4, the embodiments of the present disclosure provide yet another service processing method, with reference to FIG. 5, which is a schematic flowchart of a service processing method provided by the embodiments of the present disclosure. The service processing method shown in FIG. 5 is interactively performed by a cloud application management server, an edge server and a cloud application client. Specifically, the service processing method shown in FIG. 5 may include the following steps:

S501. A user starts a target cloud application through a cloud application client.

S502. The cloud application client detects instant network quality between the cloud application client and each edge server according to a plurality of edge servers configured locally by default.

S503. Each edge server returns the instant network quality to the cloud application client.

S504. The cloud application client reports the instant network quality of each edge server to the cloud application management server, and requests to allocate an appropriate edge server.

S505. After receiving a request of the cloud application client, the cloud application management server issues a request to each edge server so as to query the available resource quantity of each edge server.

S506. The edge server returns the respective available resource quantity to the cloud application management server.

S507. The cloud application management server filters a plurality of edge servers meeting a requirement of providing the running service of the target cloud application for the target terminal according to the instant network quality and the historical network quality of each edge server and the available resource quantity of each edge server reported by the cloud application client.

S508. Calculate a connection reference score of each edge server according to the instant network quality, the historical network quality, the available resource quantity and the operation cost of each edge server meeting the requirement of providing the running service of the target cloud application for the target terminal, and store the identification information and the connection reference score of each edge server meeting the requirement of providing the running service of the target cloud application for the target terminal into a candidate set. In the candidate set, the connection reference scores of various edge servers may be ranked in a descending order.

S509. Return the candidate set to the cloud application client, so that the cloud application client selects the most appropriate edge server from the candidate set to provide the running service of the target cloud application.

In the embodiments of the present disclosure, instead of simply allocating the edge server with the best network quality or at the closest distance, an appropriate edge server is allocated according to actual requirements of running a target cloud application, so as to avoid all the cloud application clients from concentrating on the edge server with the best network quality. When a cloud application client that really requires high network quality accesses, only the edge server with poor network quality can be allocated. In short, in the embodiments of the present disclosure, an edge server with the best network quality is not allocated for each user, but only the most appropriate edge server is selected. Thus, all experiences of using the cloud application clients can be considered.

In addition, it is to be understood that higher network quality means higher construction and operation cost of an edge server. In the embodiments of the present disclosure, an appropriate edge server is allocated to each cloud application on demand, so that each edge server is fully utilized, rather than allocating an edge server with the optimal network quality to all cloud applications, which can greatly reduce the overall operation cost.

Figure 6:
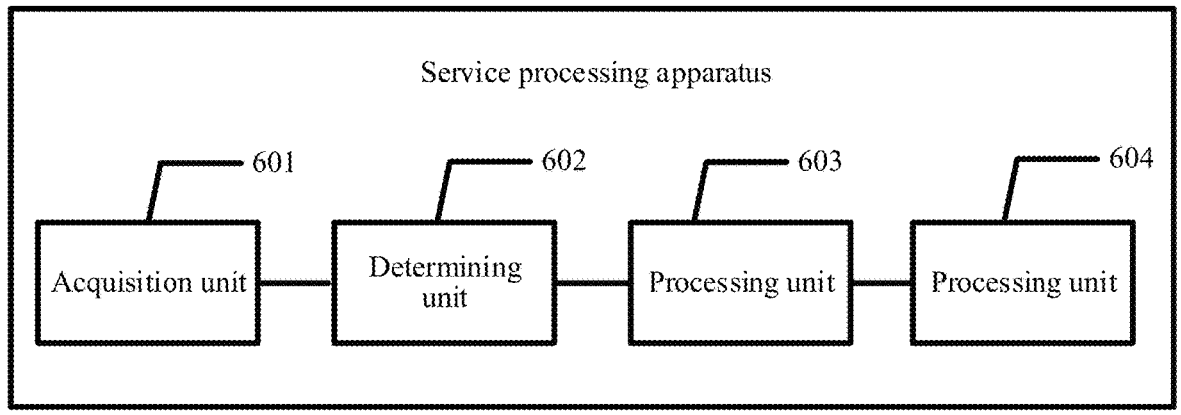
FIG. 6 is a schematic structural diagram of a service processing apparatus provided by the embodiments of the present disclosure.

Based on the above-mentioned service processing method embodiments, the embodiments of the present disclosure provide a service processing apparatus, with reference to FIG. 6, which is a schematic structural diagram of the service processing apparatus provided by the embodiments of the present disclosure. The service processing apparatus shown in FIG. 6 may run on a cloud application management server. The cloud application management server is connected to P edge servers. The P edge servers are all configured to provide a running service of a target cloud application. The service processing apparatus runs the following units:

an acquisition unit 601, configured to in response to receiving an allocation request transmitted by a target terminal, and acquire N pieces of selection reference information corresponding to a pending edge server and related to the target terminal and running reference information required for running a target cloud application, the pending edge server being one of the P edge servers, N being an integer greater than or equal to 1, and the allocation request being transmitted when the target cloud application in the target terminal starts running;

a determining unit 602, configured to determine a connection reference score corresponding to the pending edge server according to the N pieces of selection reference information and a connection reference score determination rule in response to determining, according to the N pieces of selection reference information and the running reference information, that the pending edge server meets the requirement of providing a running service of the target cloud application for the target terminal;

a processing unit 603, configured to store a connection reference score corresponding to the pending edge server and identification information about the pending edge server into a candidate set, the candidate set including identification information about M edge servers and connection reference scores corresponding to the M edge servers, and M being an integer greater than 1 and less than or equal to P; and a transmitting unit 604, configured to transmit the candidate set to the target terminal, so that the target terminal selects a target edge server according to connection reference scores corresponding to the M edge servers, and establishes a connection with the target edge server according to the identification information corresponding to the target edge server, so that the target edge server provides the running service of the target cloud application for the target terminal.

In one embodiment, the N pieces of selection reference information corresponding to the pending edge server include at least one of: instant network quality, historical network quality, available resource quantity, or operation cost for providing the running service of the target cloud application;

the instant network quality is calculated by the pending edge server according to current communication data between the target terminal and the pending edge server;

the historical network quality is calculated by the pending edge server according to historical communication data between the target terminal and the pending edge server; or, the historical network quality is calculated by the pending edge server according to historical communication data between other terminals and the pending edge server, and the other terminals and the target terminal satisfy one or more of the following conditions: being located in the same area, being connected to the pending edge server using a same accessing mode, and being serviced by a same operator.

In one embodiment, the acquisition unit 601 is further configured to acquire the bandwidth cost and resource cost required for providing the running service of the target cloud application by the pending edge server, the bandwidth cost being obtained by performing a multiplication operation on unit bandwidth cost of the pending edge server and the bandwidth required for providing the running service of the target cloud application, and the resource cost being obtained by performing a multiplication operation on the resource required for providing the running service of the target cloud application and unit resource cost; and acquire server room rental cost of the pending edge server.

The processing unit 603 is further configured to perform an addition operation on the bandwidth cost, the resource cost, and the server room rental cost to obtain the operation cost for providing the running service of the target cloud application by the pending edge server.

In one embodiment, the running reference information includes the reference network quality required for running the target cloud application, and the N pieces of selection reference information include the instant network quality and the historical network quality. The processing unit 603 is further configured to determine benchmark network quality for the communication between the pending edge server and the target terminal according to the instant network quality and the historical network quality; and when the benchmark network quality is higher than the reference network quality, determine that the pending edge server meets the requirement of providing the running service of the target cloud application for the target terminal.

In one embodiment, the running reference information includes reference resource quantity required for running the target cloud application, and the N pieces of selection reference information include the available resource quantity. The processing unit 603 is further configured to determine that the pending edge server meets a requirement of providing the running service of the target cloud application for the target terminal if the available resource quantity is greater than or equal to the reference resource quantity.

In one embodiment, when the N pieces of reference information include the instant network quality, the historical network quality, the operation cost, and the available resource quantity, then the determining unit 602 executes, in response to determining a connection reference score corresponding to the pending edge server according to the N pieces of selection reference information and a connection reference score determination rule, the following steps:

Acquire a first weight value corresponding to the benchmark network quality, a second weight value corresponding to the operation cost, and a third weight value corresponding to the available resource quantity. Input the benchmark network quality, the first weight value, the operation cost, the second weight value, the available resource quantity, and the third weight value into an operation formula corresponding to the connection reference score determination rule for calculation, so as to obtain a connection reference score corresponding to the pending edge server.

In one embodiment, the processing unit 603 executes, in response to determining the benchmark network quality for the communication between the pending edge server and the target terminal according to the instant network quality and the historical network quality, the following step: Take the poorer of the instant network quality and the historical network quality as the benchmark network quality.

According to an embodiment of the present disclosure, the steps in the service processing method shown in FIG. 2 may be performed by the units of the service processing apparatus shown in FIG. 6. For example, S201 shown in FIG. 2 may be performed by the obtaining unit 601 in the service processing apparatus shown in FIG. 6, S202 may be performed by the determining unit 602 in the service processing apparatus shown in FIG. 6, S203 may be performed by the processing unit 603 in the service processing apparatus shown in FIGS. 6, and S204 may be performed by the transmitting unit 604 in the service processing apparatus shown in FIG. 6.

According to another embodiment of the present disclosure, units of the system for the service processing apparatus shown in FIG. 6 may be separately or wholly combined into one or several other units, or one (or more) of the units herein may further be divided into multiple units of smaller functions. In this way, same operations can be implemented, and implementation of the technical effects of the embodiments of the present disclosure is not affected. The foregoing units are divided based on logical functions. In an actual application, a function of one unit may also be implemented by a plurality of units, or functions of a plurality of units are implemented by one unit. In other embodiments of the present disclosure, the service processing apparatus may also include other units. In an actual application, the functions may also be cooperatively implemented by other units and may be cooperatively implemented by a plurality of units.

According to another embodiment of the present disclosure, a computer program (including program code) that can perform the steps in the corresponding method shown in FIG. 2 may be run on a general computing device, such as a computer, which includes processing elements and storage elements such as a central processing unit (CPU), a random access memory (RAM), and a read-only memory (ROM), to construct the service processing apparatus shown in FIG. 6 and implement the service processing method in the embodiments of the present disclosure. The computer program may be recorded in, for example, a computer-readable storage medium, and may be loaded into the foregoing node device by using the computer-readable storage medium, and run on the computing device.

In the embodiments of the present disclosure, when a target cloud application in a target terminal starts running, the target terminal may transmit an allocation request to a cloud application management server. After receiving the allocation request, the cloud application management server acquires N pieces of selection reference information corresponding to a pending edge server (i.e., one of the P edge servers) and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server satisfies a candidate condition for providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers.

In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

Figure 7:
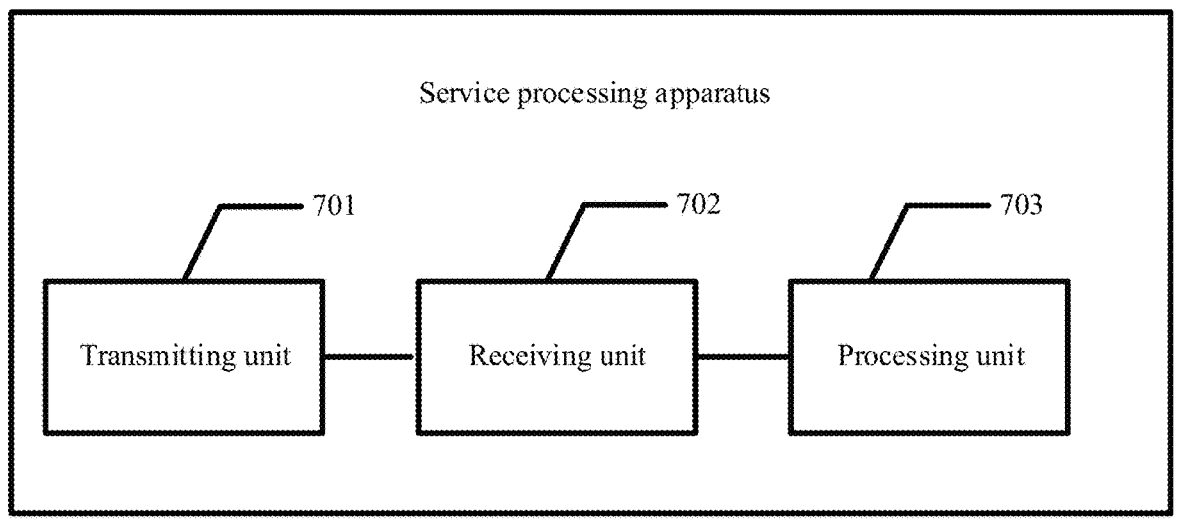
FIG. 7 is a schematic structural diagram of another service processing apparatus provided by the embodiments of the present disclosure.

Based on the above-mentioned service processing method embodiments and service processing apparatus embodiments, the embodiments of the present disclosure provide another service processing apparatus, with reference to FIG. 7, which is a schematic structural diagram of another service processing apparatus provided by the embodiments of the present disclosure. The service processing apparatus shown in FIG. 7 may run the following units:

a transmitting unit 701, configured to enable, when a target cloud application in a target terminal starts running, the target terminal to transmit an allocation request to a cloud application management server, the cloud application management server being connected to P edge servers, and the P edge servers being all configured to provide a running service of the target cloud application; the allocation request being used for instructing the cloud application management server to return a candidate set, the candidate set including connection reference scores of M edge servers and identification information about the M edge servers, and in response to determining, according to N pieces of selection reference information corresponding to the pending edge server and related to the target terminal and the running reference information required for running the target cloud application, that the pending edge server meets the requirement of providing a running service of the target cloud application for the target terminal, a method of determining the connection reference score of any of the M edge servers being to take each of the P edge servers as a pending edge server, and to determine according to the N pieces of selection reference information and the connection reference score; N being an integer greater than or equal to 1, and M being an integer greater than or equal to 1 and less than or equal to P;

a receiving unit 702, configured to receive the candidate set transmitted by the cloud application management server, and select a target edge server from the M edge servers according to the connection reference scores respectively corresponding to the M edge servers in the candidate set; and a processing unit 703, configured to establish a connection with the target edge server according to identification information about the target edge server, so that the target edge server provides the running service of the target cloud application for the target terminal.

In one embodiment, the transmitting unit 701 is further configured to transmit a network quality acquisition request to the pending edge server of the P edge servers when a target cloud application in a target terminal starts running, the network quality acquisition request being used for instructing the pending edge server to calculate instant network quality according to current communication data between the pending edge server and the target terminal;

the receiving unit 702 is configured to receive the instant network quality transmitted by the pending edge server; and the processing unit 703 is further configured to upload the instant network quality to the cloud application management server.

In one embodiment, the processing unit 703 performs, in response to selecting a target edge server from the M edge servers according to connection reference scores corresponding to the M edge servers, the following steps: Traverse the M edge servers to determine edge servers in a connectable state. Select an edge server with the highest reference score or the lowest operation cost as the target edge server from the edge servers in the connectable state.

In one embodiment, the processing unit 703 performs, in response to selecting a target edge server from the M edge servers according to connection reference scores corresponding to the M edge servers, the following steps:

Acquire, from the M edge servers, a plurality of candidate edge servers at a distance from the target terminal less than a distance threshold. Take the edge server with the highest connection reference score of the plurality of candidate edge servers as the target edge server.

According to an embodiment of the present disclosure, the steps in the service processing method shown in FIG. 3 may be performed by the units of the service processing apparatus shown in FIG. 7. For example, S301 shown in FIG. 3 may be performed by the transmitting unit 701 in the service processing apparatus shown in FIG. 7, S302 may be performed by the receiving unit 702 in the service processing apparatus shown in FIGS. 7, and S303 may be performed by the processing unit 703 in the service processing apparatus shown in FIG. 7.

According to another embodiment of the present disclosure, units of the system for the service processing apparatus shown in FIG. 7 may be separately or wholly combined into one or several other units, or one (or more) of the units herein may further be divided into multiple units of smaller functions. In this way, same operations can be implemented, and implementation of the technical effects of the embodiments of the present disclosure is not affected. The foregoing units are divided based on logical functions. In an actual application, a function of one unit may also be implemented by a plurality of units, or functions of a plurality of units are implemented by one unit. In other embodiments of the present disclosure, the service processing apparatus may also include other units. In an actual application, the functions may also be cooperatively implemented by other units and may be cooperatively implemented by a plurality of units.

According to another embodiment of the present disclosure, a computer program (including program code) that can perform the steps in the corresponding method shown in FIG. 3 may be run on a general computing device, such as a computer, which includes processing elements and storage elements such as a central processing unit (CPU), a random access memory (RAM), and a read-only memory (ROM), to construct the service processing apparatus shown in FIG. 7 and implement the service processing method in the embodiments of the present disclosure. The computer program may be recorded in, for example, a computer-readable storage medium, and may be loaded into the foregoing node device by using the computer-readable storage medium, and run on the computing device.

In the embodiments of the present disclosure, when a target cloud application in a target terminal starts running, the target terminal may transmit an allocation request to a cloud application management server. After receiving the allocation request, the cloud application management server acquires N pieces of selection reference information corresponding to a pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server meets a requirement of providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

Figure 8:
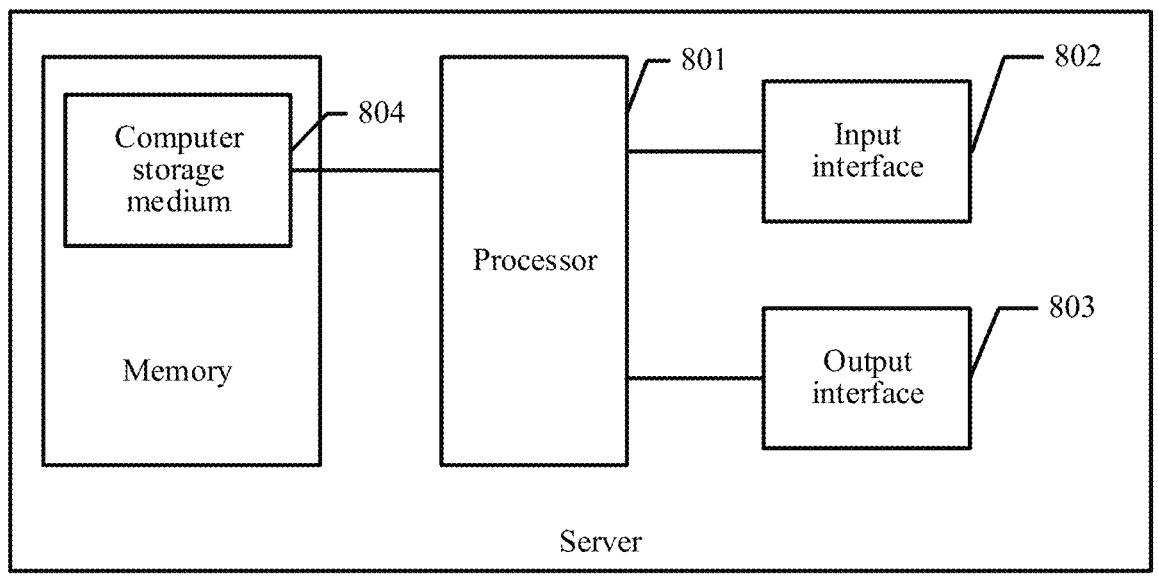
FIG. 8 is a schematic structural diagram of a server provided by the embodiments of the present disclosure.

Based on the above-mentioned method embodiments and apparatus embodiments, the embodiments of the present disclosure further provide a device for service processing, and the device may be a server. That is, the embodiments of the present disclosure provide a server corresponding to the above-mentioned cloud application management server. Reference is made to FIG. 8, which is a schematic structural diagram of a server is provided by the embodiments of the present disclosure. The server shown in FIG. 8 may include a processor 801, an input interface 802, an output interface 803, and a computer storage medium 804. The processor 801, the input interface 802, the output interface 803 and the computer storage medium 804 may be connected by a bus or in other manners.

The computer storage medium 804 may be stored in a memory of the server. The computer storage medium 804 is configured to store a computer program. The processor 901 is configured to execute the computer program stored in the computer storage medium 804. The processor 801 (or referred to as a central processing unit (CPU)) is a computing core and a control core of the server, is suitable for implementing one or more computer programs, and is further suitable for loading and executing:

in response to receiving an allocation request transmitted by a target terminal, respectively taking each of the P edge servers as a pending edge server, and acquiring N pieces of selection reference information corresponding to the pending edge server and related to the target terminal and the running reference information required for running the target cloud application, N being an integer greater than or equal to 1, and the allocation request being transmitted when the target cloud application in the target terminal starts running; determining a connection reference score corresponding to the pending edge server according to the N pieces of selection reference information and a connection reference score determination rule in response to determining, according to the N pieces of selection reference information and the running reference information, that the pending edge server meets a requirement of providing a running service of the target cloud application for the target terminal;

storing the connection reference score corresponding to the pending edge server and identification information about the pending edge server into a candidate set, the candidate set including identification information about M edge servers and connection reference scores corresponding to the M edge servers, and M being an integer greater than 1 and less than or equal to P; and transmitting the candidate set to the target terminal, so that the target terminal selects a target edge server according to the connection reference scores corresponding to the M edge servers and establishes a connection with the target edge server according to the identification information corresponding to the target edge server, and then the target edge server provides the running service of the target cloud application for the target terminal.

In the embodiments of the present disclosure, when a target cloud application in a target terminal starts running, the target terminal may transmit an allocation request to a cloud application management server. After receiving the allocation request, the cloud application management server takes each of the P edge servers as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server satisfies a candidate condition for providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

Figure 9:
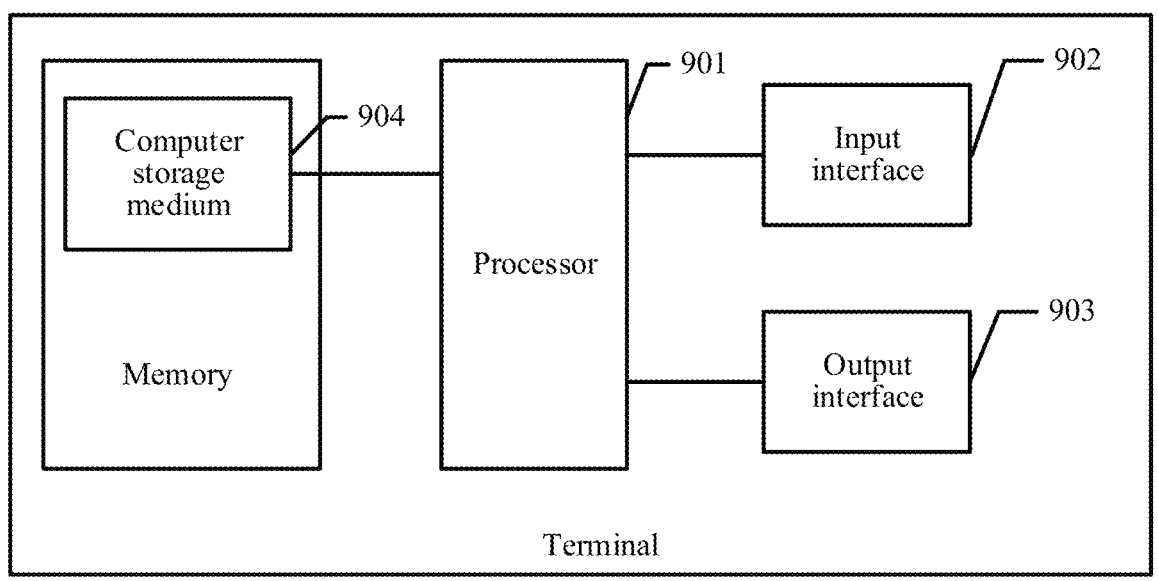
FIG. 9 is a schematic structural diagram of a terminal provided by the embodiments of the present disclosure.

Based on the foregoing method embodiments and apparatus embodiments, an embodiment of the present disclosure provide a terminal, corresponding to the foregoing target terminal. FIG. 9 is a schematic structural diagram of a terminal according to an embodiment of the present disclosure. The terminal shown in FIG. 9 may include a processor 901, an input interface 902, an output interface 903, and a computer storage medium 904. The processor 901, the input interface 902, the output interface 903 and the computer storage medium 904 may be connected by a bus or in other manners.

The computer storage medium 904 may be stored in a memory of the server. The computer storage medium 904 is configured to store a computer program. The processor 901 is configured to execute the computer program stored in the computer storage medium 904. The processor 901 (or referred to as a central processing unit (CPU)) is a computing core and a control core of the terminal, is suitable for implementing one or more computer programs, and is further suitable for loading and executing:

when a target cloud application in a target terminal starts running, transmitting, by the target terminal, an allocation request to a cloud application management server, the cloud application management server being connected to P edge servers, and the P edge servers being all configured to provide a running service of the target cloud application; the allocation request being used for instructing the cloud application management server to return a candidate set, the candidate set including connection reference scores of M edge servers and identification information about the M edge servers, and in response to determining, according to N pieces of selection reference information corresponding to the pending edge server and related to the target terminal and the running reference information required for running the target cloud application, that the pending edge server meets the requirement of providing a running service of the target cloud application for the target terminal, a method of determining the connection reference score of any of the M edge servers being to take each of the P edge servers as a pending edge server, and to determine according to the N pieces of selection reference information and the connection reference score; N being an integer greater than or equal to 1, and M being an integer greater than or equal to 1 and less than or equal to P;

receiving, by the target terminal, the candidate set transmitted by the cloud application management server, and selecting a target edge server from the M edge servers according to the connection reference scores respectively corresponding to the M edge servers in the candidate set; and establishing, by the target terminal, a connection with the target edge server according to the identification information about the target edge server, so that the target edge server provides the running service of the target cloud application for the target terminal.

In the embodiments of the present disclosure, when a target cloud application in a target terminal starts running, the target terminal may transmit an allocation request to a cloud application management server. After receiving the allocation request, the cloud application management server takes each of the P edge servers as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server satisfies a candidate condition for providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

This embodiment of the present disclosure further provides a computer storage medium (memory). The computer storage medium is a storage device in a server or in a terminal and is configured to store a program and data. The computer storage medium herein may include an internal storage medium of the server or the terminal and may also include an expanded storage medium supported by the server or the terminal. The computer storage medium provides storage space, and the storage space stores an operating system of the server or the terminal. The storage space also stores one or more first computer programs adapted to be loaded and executed by the processor 801 or one or more second computer programs adapted to be loaded and executed by the processor 901. The computer storage medium herein may be a high-speed RAM, or may be a non-volatile memory, such as at least one magnetic disk storage. In one embodiment, the computer storage medium may be at least one computer storage medium far away from the foregoing processor.

In one embodiment, the computer storage medium may be loaded by the processor 801 and execute one or more computer programs (e.g. a first computer program) stored in the computer storage medium to implement corresponding steps of the service processing method described in above-mentioned FIG. 2.

In one embodiment, the computer storage medium may be loaded by the processor 901 and execute one or more computer programs (e.g. a second computer program) stored in the computer storage medium to implement corresponding steps of the service processing method described in above-mentioned FIG. 3.

According to one aspect of the present disclosure, the embodiments of the present disclosure further provide a computer product or a computer program, the computer product including a first computer program or a second computer program, and the first computer program or the second computer program being stored in a computer-readable storage medium. The processor 801 reads the first computer program from the computer-readable storage medium, so that the server loads and executes the corresponding steps of the service processing method described in above-mentioned FIG. 2.

Or, the processor 901 reads a second computer program from a computer-readable storage medium, and the processor 901 executes the second computer program, so that the terminal performs the service processing method shown in FIG. 3.

In the embodiments of the present disclosure, when a target cloud application in a target terminal starts running, the target terminal may transmit an allocation request to a cloud application management server. After receiving the allocation request, the cloud application management server takes each of the P edge servers as a pending edge server respectively, and acquires N pieces of selection reference information corresponding to the pending edge server and related to the target terminal and the running reference information required for running the target cloud application in the target terminal. In response to determining, according to the N pieces of selection reference information and the running reference information, that the pending edge server meets a requirement of providing the running service of the target cloud application for the target terminal, a connection reference score corresponding to the pending edge server is determined according to the N pieces of selection reference information and a connection reference score determination rule, and the connection reference score and identification information about the pending edge server are stored in a candidate set. The candidate set includes connection reference scores and identification information about the M edge servers. The candidate set is transmitted to the target terminal, and then the target terminal selects an edge server from the candidate set to provide a running service of the target cloud application for the target terminal.

It can be known from the foregoing that only when a pending edge server satisfies a candidate condition for providing a running service of a target cloud application for a target terminal, the pending edge server can be stored in a candidate set. That is to say, M edge servers in the candidate set all meet a requirement of providing the running service of the target cloud application for the target terminal. The pending edge server meeting the requirement of providing the running service of the target cloud application for the target terminal may be understood that a user has a better application experience when the pending edge server provides the running service of the target cloud application. The candidate set is provided for the target terminal, so that the target terminal selects an edge server needing to be connected therefrom, which allocates edge servers on demand and ensures the balance of the allocation of the edge servers. In short, in terms of the embodiments of the present disclosure, an edge server is provided for the target terminal in such an allocation strategy of "not allocating an optimal one, but only allocating an appropriate one". In addition, the M edge servers all correspond to a connection reference score, and the target terminal may select an edge server from the M edge servers according to the connection reference score to provide the running service of the target cloud application for the target terminal. It is to be understood that an optimal edge server may be selected from "appropriate edge servers" by selecting the edge server according to the connection reference score. When the selected edge server provides the running service of the target cloud application for the target terminal, high-quality running of the target cloud application in the target terminal can be guaranteed, so that the application experience of a user can be improved.

What is claimed is:

1. A service processing method, performed by a cloud application management server, the cloud application management server being connected to P edge servers, the method comprising:
   in response to receiving an allocation request transmitted by a target terminal, acquiring N pieces of selection reference information corresponding to a pending edge server and related to the target terminal and running reference information required for running the target cloud application, the pending edge server being one of the P edge servers, N being an integer greater than or equal to 1, and the allocation request being transmitted when the target cloud application in the target terminal starts running;
   determining a connection reference score corresponding to the pending edge server according to the N pieces of selection reference information and a connection reference score determination rule in response to determining, according to the N pieces of selection reference information and the running reference information, that the pending edge server meets a requirement of providing a running service of the target cloud application for the target terminal;
   storing the connection reference score corresponding to the pending edge server and identification information about the pending edge server into a candidate set, the candidate set comprising identification information about M edge servers and connection reference scores corresponding to the M edge servers, and M being an integer greater than 1 and less than or equal to P; and
   transmitting the candidate set to the target terminal.

2. The method according to claim 1, wherein the N pieces of selection reference information corresponding to the pending edge server comprise at least one or more of: instant network quality, historical network quality, available resource quantity, or operation cost for providing the running service of the target cloud application; wherein
   the instant network quality is calculated by the pending edge server according to current communication data between the target terminal and the pending edge server; and
   the historical network quality is calculated by the pending edge server according to historical communication data between the target terminal and the pending edge server; or, the historical network quality is calculated by the pending edge server according to historical communication data between other terminals and the pending edge server, and the other terminals and the target terminal satisfy conditions including one or more of: being located in a same area, being connected to the pending edge server using a same accessing mode, and being serviced by a same operator.

3. The method according to claim 2, further comprising:
   acquiring a bandwidth cost and a resource cost required for providing the running service of the target cloud application by the pending edge server, the bandwidth cost being obtained by performing a multiplication operation on unit bandwidth cost of the pending edge server and the bandwidth required for providing the running service of the target cloud application, and the resource cost being obtained by performing a multiplication operation on the resource required for providing the running service of the target cloud application and unit resource cost;
   acquiring server room rental cost of the pending edge server; and
   performing an addition operation on the bandwidth cost, the resource cost, and the server room rental cost to obtain the operation cost of for providing the running service of the target cloud application by the pending edge server.

4. The method according to claim 2, wherein the running reference information comprises the reference network quality required for running the target cloud application, the N pieces of selection reference information comprise the instant network quality and the historical network quality, and the determining, according to the N pieces of selection reference information and the running reference information, that the pending edge server meets a requirement of providing a running service of the target cloud application for the target terminal comprises:
   determining benchmark network quality for a communication between the pending edge server and the target terminal according to the instant network quality and the historical network quality; and when the benchmark network quality is higher than the reference network quality, determining that the pending edge server meets the requirement of providing the running service of the target cloud application for the target terminal.

5. The method according to claim 2, wherein the running reference information comprises the reference resource quantity required for running the target cloud application, the N pieces of selection reference information comprise the available resource quantity, and the determining, according to the N pieces of selection reference information and the running reference information, that the pending edge server meets a requirement of providing a running service of the target cloud application for the target terminal comprises:

when the available resource quantity is greater than or equal to the reference resource quantity, determining that the pending edge server meets the requirement of providing the running service of the target cloud application for the target terminal.

6. The method according to claim 4, wherein when the N pieces of reference information comprise the instant network quality, the historical network quality, the operation cost, and the available resource quantity, then the determining a connection reference score corresponding to the pending edge server according to the N pieces of selection reference information and a connection reference score determination rule comprises:

acquiring a first weight value corresponding to the benchmark network quality, a second weight value corresponding to the operation cost, and a third weight value corresponding to the available resource quantity; and inputting the benchmark network quality, the first weight value, the operation cost, the second weight value, the available resource quantity, and the third weight value into an operation formula corresponding to the connection reference score determination rule for calculation, so as to obtain a connection reference score corresponding to the pending edge server.

7. The method according to claim 4, wherein the determining benchmark network quality for the communication between the pending edge server and the target terminal according to the instant network quality and the historical network quality comprises:

taking the poorer of the instant network quality and the historical network quality as the benchmark network quality.

8. The method according to claim 1, wherein the candidate set includes candidates of a target edge server selectable by the target terminal for providing the running service of the target cloud application for the target terminal.

9. A service processing apparatus, configured in a cloud application management server, the cloud application management server being connected to P edge servers, and the apparatus comprising:

a processor, adapted to execute a computer program; and
a computer storage medium, storing a computer program, the computer program, when executed by the processor, implementing:

in response to receiving an allocation request transmitted by a target terminal, acquiring N pieces of selection reference information corresponding to a pending edge server and related to the target terminal and running reference information required for running the target cloud application, the pending edge server being one of the P edge servers, N being an integer greater than or equal to 1, and the allocation request being transmitted when the target cloud application in the target terminal starts running;

determining a connection reference score corresponding to the pending edge server according to the N pieces of selection reference information and a connection reference score determination rule in response to determining, according to the N pieces of selection reference information and the running reference information, that the pending edge server meets a requirement of providing a running service of the target cloud application for the target terminal;

storing the connection reference score corresponding to the pending edge server and identification information about the pending edge server into a candidate set, the candidate set comprising identification information about M edge servers and connection reference scores corresponding to the M edge servers, and M being an integer greater than 1 and less than or equal to P; and transmitting the candidate set to the target terminal.

10. The apparatus according to claim 9, wherein the N pieces of selection reference information corresponding to the pending edge server comprise at least one or more of: instant network quality, historical network quality, available resource quantity, or operation cost for providing the running service of the target cloud application; wherein the instant network quality is calculated by the pending edge server according to current communication data between the target terminal and the pending edge server; and the historical network quality is calculated by the pending edge server according to historical communication data between the target terminal and the pending edge server; or, the historical network quality is calculated by the pending edge server according to historical communication data between other terminals and the pending edge server, and the other terminals and the target terminal satisfy conditions including one or more of: being located in a same area, being connected to the pending edge server using a same accessing mode, and being serviced by a same operator.

11. The apparatus according to claim 10, wherein the processor is further configured to perform:

acquiring a bandwidth cost and a resource cost required for providing the running service of the target cloud application by the pending edge server, the bandwidth cost being obtained by performing a multiplication operation on unit bandwidth cost of the pending edge server and the bandwidth required for providing the running service of the target cloud application, and the resource cost being obtained by performing a multiplication operation on the resource required for providing the running service of the target cloud application and unit resource cost;

acquiring server room rental cost of the pending edge server; and performing an addition operation on the bandwidth cost, the resource cost, and the server room rental cost to obtain the operation cost of for providing the running service of the target cloud application by the pending edge server.

12. The apparatus according to claim 10, wherein the running reference information comprises the reference network quality required for running the target cloud application, the N pieces of selection reference information comprise the instant network quality and the historical network quality, and the determining, according to the N pieces of selection reference information and the running reference information, that the pending edge server meets a requirement of providing a running service of the target cloud application for the target terminal comprises:

determining benchmark network quality for a communication between the pending edge server and the target terminal according to the instant network quality and the historical network quality; and when the benchmark network quality is higher than the reference network quality, determining that the pending edge server meets the requirement of providing the running service of the target cloud application for the target terminal.

13. The apparatus according to claim 10, wherein the running reference information comprises the reference resource quantity required for running the target cloud application, the N pieces of selection reference information comprise the available resource quantity, and the determining, according to the N pieces of selection reference information and the running reference information, that the pending edge server meets a requirement of providing a running service of the target cloud application for the target terminal comprises:

when the available resource quantity is greater than or equal to the reference resource quantity, determining that the pending edge server meets the requirement of providing the running service of the target cloud application for the target terminal.

14. The apparatus according to claim 12, wherein when the N pieces of reference information comprise the instant network quality, the historical network quality, the operation cost, and the available resource quantity, then the determining a connection reference score corresponding to the pending edge server according to the N pieces of selection reference information and a connection reference score determination rule comprises:

acquiring a first weight value corresponding to the benchmark network quality, a second weight value corresponding to the operation cost, and a third weight value corresponding to the available resource quantity; and inputting the benchmark network quality, the first weight value, the operation cost, the second weight value, the available resource quantity, and the third weight value into an operation formula corresponding to the connection reference score determination rule for calculation, so as to obtain a connection reference score corresponding to the pending edge server.

15. The apparatus according to claim 12, wherein the determining benchmark network quality for the communication between the pending edge server and the target terminal according to the instant network quality and the historical network quality comprises:

taking the poorer of the instant network quality and the historical network quality as the benchmark network quality.

16. The apparatus according to claim 9, wherein the candidate set includes candidates of a target edge server selectable by the target terminal for providing the running service of the target cloud application for the target terminal.

17. A non-transitory computer storage medium, storing a computer program, the computer program, when executed by a processor of a cloud application management server which is connected to P edge servers, causing the processor to implement:

in response to receiving an allocation request transmitted by a target terminal, acquiring N pieces of selection reference information corresponding to a pending edge server and related to the target terminal and running reference information required for running the target cloud application, the pending edge server being one of the P edge servers, N being an integer greater than or equal to 1, and the allocation request being transmitted when the target cloud application in the target terminal starts running;

determining a connection reference score corresponding to the pending edge server according to the N pieces of selection reference information and a connection reference score determination rule in response to determining, according to the N pieces of selection reference information and the running reference information, that the pending edge server meets a requirement of providing a running service of the target cloud application for the target terminal;

storing the connection reference score corresponding to the pending edge server and identification information about the pending edge server into a candidate set, the candidate set comprising identification information about M edge servers and connection reference scores corresponding to the M edge servers, and M being an integer greater than 1 and less than or equal to P; and transmitting the candidate set to the target terminal.

18. The storage medium according to claim 17, wherein the N pieces of selection reference information corresponding to the pending edge server comprise at least one or more of: instant network quality, historical network quality, available resource quantity, or operation cost for providing the running service of the target cloud application; wherein the instant network quality is calculated by the pending edge server according to current communication data between the target terminal and the pending edge server; and the historical network quality is calculated by the pending edge server according to historical communication data between the target terminal and the pending edge server; or, the historical network quality is calculated by the pending edge server according to historical communication data between other terminals and the pending edge server, and the other terminals and the target terminal satisfy conditions including one or more of: being located in a same area, being connected to the pending edge server using a same accessing mode, and being serviced by a same operator.

19. The storage medium according to claim 18, wherein the computer program further cause the processor to perform:

acquiring a bandwidth cost and a resource cost required for providing the running service of the target cloud application by the pending edge server, the bandwidth cost being obtained by performing a multiplication operation on unit bandwidth cost of the pending edge server and the bandwidth required for providing the running service of the target cloud application, and the resource cost being obtained by performing a multiplication operation on the resource required for providing the running service of the target cloud application and unit resource cost;

acquiring server room rental cost of the pending edge server; and performing an addition operation on the bandwidth cost, the resource cost, and the server room rental cost to obtain the operation cost of for providing the running service of the target cloud application by the pending edge server.

20. The storage medium according to claim 18, wherein the running reference information comprises the reference network quality required for running the target cloud application, the N pieces of selection reference information comprise the instant network quality and the historical network quality, and the determining, according to the N pieces of selection reference information and the running reference information, that the pending edge server meets a requirement of providing a running service of the target cloud application for the target terminal comprises:
- determining benchmark network quality for a communication between the pending edge server and the target terminal according to the instant network quality and the historical network quality; and
- when the benchmark network quality is higher than the reference network quality, determining that the pending edge server meets the requirement of providing the running service of the target cloud application for the target terminal.

\* \* \* \* \*